Patented July 19, 1938

2,123,880

UNITED STATES PATENT OFFICE 2,123,880

COMPOSITIONS OF MATTER

Herbert S. Coith, Albert S. Richardson, and Verling M. Votaw, Wyoming, Ohio, assignors to The Procter & Gamble Company, Cincinnati, Ohio, a corporation of Ohio No Drawing. Application October 23, 1933, Serial No. 694,912. Renewed October 21, 1937

16 Claims. (Cl. 99—92)

Our invention relates to cakes containing more sugar than flour and to processes of making the same.

The object of our invention is to produce cakes of unusually high sugar content and of improved appearance and eating qualities, particularly with respect to a uniformly light and tender texture. Moistness, sweetness, and tenderness are highly prized in cakes and are obtained in increasing degree as the proportion of sugar to flour is increased and moisture is added. However, as these changes in the cake formula are made, the finished cake becomes smaller in volume and heavier in texture until a point is reached when the cake made with the usual commercial ingredients falls at the end of the baking and is thus "sad" and a complete failure. Because of this tendency of the cake to fall, the amount of sugar in commercial cakes made with the usual commercial ingredients is on the average limited to less than the weight of flour present, notwithstanding the fact that more sugar and along with it more moisture would be advantageous from the standpoint of the best eating and keeping qualities of the cake. By the practice of our invention we overcome or in large measure counteract this tendency of cakes to fall as the proportion of sugar to flour and the accompanying moisture content are increased, and we make possible unusually high ratios of sugar to flour without sacrifice of the light texture which is essential.

The present application is a continuation in part of our copending application Serial No. 655,295, and derives subject matter also from our copending applications Serial Nos. 655,292 and 655,293, all filed February 4, 1933. In these applications we have disclosed that cakes of unusually high sugar content and of satisfactory volume and texture can be made with use of shortening comprising monoglyceride and/or diglyceride, and have also shown that further improvement in the volume and texture of such cakes is obtained by including a small quantity of soap in the mix. In such cakes almost the maximum effect of soap is obtained by the use of surprisingly small quantities, so that a quantity of soap equal to about .025 per cent of the weight of total cake batter is of considerable value, but the further improvement due to larger quantities is of little practical importance.

We have also found that the sugar carrying capacity of cakes made with use of other shortenings, even those consisting of practically pure triglyceride, is greatly increased if at some point in the mixing of the batter there is introduced a suitable quantity of soap. The required quantity of soap for use with triglyceride shortening may be roughly described as several times the critical quantity found desirable as an adjunct to superglycerinated shortening and is more fully discussed hereinafter. Thus a particular advantage of the present invention is that any of the ordinary commercial shortenings are made available for use in cakes containing more sugar than flour, without undue tendency of the cake to fall. With the practice of the present invention, even as much as 130 per cent to 150 per cent sugar on the basis of the flour may be successfully incorporated in the cake mixture and the proportions of milk and other liquid constituents also increased. These changes result in cakes of unusually fine texture, flavor, and keeping quality.

We have found soaps of all types to possess this property of increasing the sugar carrying capacity of cakes, provided the soap is intimately mixed into the cake batter. For practical use we find the most effective soaps to be those possessing a considerable degree of water solubility. Even a soap that is practically insoluble in water may be used if sufficient care is taken to mix it intimately into the cake batter, as illustrated in Example 3, by thorough mixing of freshly precipitated calcium soap with the shortening before the other ingredients are added.

Very effective soaps for use in the practice of our invention are the common alkali metal soaps of fatty acids having a comparatively low titer, i. e., congealing point, for example 12° C. to 18° C. Soaps of higher titers are also effective but are likely to produce cakes with less volume than the soaps of lower titer.

Of course, effect on cake volume is not the only factor to be considered in selecting the most suitable soap. The soap ought to be prepared from strictly edible fats or oils and should be free from objectionable flavor both while fresh and after aging under normal commercial conditions of storage and handling. Soaps derived chiefly from coconut oil, or from similar oils containing large proportions of combined lauric acid and other fatty acids of molecular formula below 16 carbon content, have the desired degree of solubility but tend to impart a sharp soapy flavor to the cake in which they are used. Soaps of linoleic acid, or of other fatty acids of molecular formula containing 16 or more carbon atoms and two or more double bonds, also have the desired degree of water solubility and are easily prepared with good flavor but tend to become rancid rapidly if exposed to air.

Alkali metal soaps derived from oleic acid, or from a mixture of oleic with a smaller proportion of palmitic and stearic acids, combine the desired degree of water solubility with good flavor and keeping quality. In general, we find it preferable to use soap from fats and oils which are predominantly unsaturated and which contain no large proportion of fatty acid of molecular formula having more than one double bond or having fewer than sixteen carbon atoms.

This preferred soap may be prepared, for instance, from tallow, lard, palm oil, or olive oil, each of which contains a considerable proportion of combined oleic acid. If the soap is prepared from cottonseed or other oil derived in large part from linoleic acid, the keeping quality of the soap can be improved without loss of effectiveness by partially hydrogenating the oil so as to convert most of the linoleic acid to oleic acid. Similarly if the soap used in our process is made from a highly unsaturated oil such as whale oil or other marine or drying oil, the oil is preferably hydrogenated to an iodine value between 60 and 80.

Sodium soaps are preferred to potassium soaps because they are fully as effective as potassium soaps and have the advantage of being lower in cost. The fats used for making these soaps should be of edible grade.

When shortening consisting of triglyceride is used in cakes containing more sugar than flour, the quantity of soap which we have found desirable is at least about .05 per cent but need not exceed about .4 per cent of the total weight of the cake batter. However, we do not limit ourselves to this exact range since appreciable improvement in the texture and quality of the cakes can be obtained below this preferred range, and excellent results are obtained above this range. When the amount of soap greatly exceeds the amount mentioned, the cake may have a soapy taste. It is obviously intended by broad reference to a soap herein to include mixtures of several different kinds of soap in which the total amount of soap employed falls within the required limits.

In the examples which follow, the soap is added as a separate ingredient to the mixture to be baked. We have found this procedure to give the improved result which we have described. However, the required quantity of soap may also be premixed with the shortening or with any of the other constituents of the cake, according to convenience of operation, and may be introduced at practically any point prior to the final mixing of the whole batch.

*Example 1.*—Following is a formula and mixing method for a yellow layer cake of high sugar content. The soap used is essentially sodium oleate.

|  | Pounds | Ounces |
|---|---|---|
| Sugar | 1 | 7¼ |
| Salt |  | ½ |
| Flour | 1 |  |
| Baking powder |  | ¾ |
| Milk | 1 |  |
| Hydrogenated fat |  | 8 |
| Whole egg |  | 10 |
| Sodium oleate |  | 2.26 grams |

The fat and the flour are put into the bowl of a mixing machine, e. g. a Hobart bench type mixer, and mixed for 3 minutes at low speed. The sugar, salt, baking powder, and 8 ounces of milk in which has been dissolved the soap are then added and the mixing continued at low speed for 3 minutes. The remainder of the milk and the egg are then added and the mixing continued for a final 3 minutes. Baking is carried out at 375° F. in layer cake pans. The cake from this formula without the addition of soap may fall and in any case has about 17 per cent less volume than when our invention is practiced.

*Example 2.*—Following is a formula for a high sugar white layer cake.

|  | Pounds | Ounces |
|---|---|---|
| Sugar | 1 | 7¼ |
| Flour | 1 |  |
| Baking powder |  | ¾ |
| Salt |  | ½ |
| Hydrogenated plastic fat |  | 8 |
| Milk | 1 |  |
| Eggwhites |  | 10 |
| Dried tallow soap |  | 1.13 grams |

The same mixing and baking procedure is used as in Example 1. The cake from this formula without soap falls and has a volume about 10 per cent less than when our invention is practiced.

*Example 3.*—Following is a formula for a high sugar white layer cake.

| | Ounces |
|---|---|
| Hydrogenated plastic fat | 8 |
| Freshly precipitated calcium soap of tallow fatty acids | ½ |
| Water (associated with the soap) | 3 |

The above ingredients were mixed together and the following added to complete the cake mix.

|  | Pounds | Oounces |
|---|---|---|
| Flour | 1 | 0 |
| Sugar | 1 | 7¼ |
| Baking powder |  | ¾ |
| Salt |  | ½ |
| Milk |  | 13 |
| Egg whites |  | 10 |

The general method of mixing the ingredients is the same as in Example 1.

The cake from this formula is about 17 per cent larger than the corresponding cake containing no soap.

We do not specifically claim herein any cakes made with superglycerinated shortening, this being more particularly covered in our application Serial No. 655,295.

Having thus described the invention, what is claimed as new and desired to be secured by Letters Patent is:

1. In the process of making cake baked from a mix containing more sugar than flour and containing shortening fat, the step which consists in incorporating soap in the mix, the quantity of soap employed being sufficient to effect substantial increase in volume of the finished product as compared with cake otherwise similar but containing no soap, but being insufficient to adversely affect the flavor of the cake.

2. In the process of making cake from a mix containing more sugar than flour and containing shortening consisting essentially of triglyceride, the step which consists in adding as a constituent of the mix an amount of water soluble soap between .05 per cent and .4 per cent of the total weight of the mix.

3. In the process of making cake from a mix containing more sugar than flour and containing shortening fat, the step which consists in adding as a constituent of the mix a water soluble soap derived from fatty acids of molecular formula containing at least 16 carbon atoms, the amount of soap thus added being between about .05% and .4% of the total weight of the mix.

4. In the process of making cake from a mix containing more sugar than flour and containing shortening fat, the step which consists in adding as a constituent of the mix soap derived from fatty acids predominantly unsaturated and predominantly of molecular formula containing at least 16 carbon atoms, the amount of soap thus added being between about .05% and .4% of the total weight of the mix.

5. In the process of making cake from a mix containing more sugar than flour and containing shortening fat, the step which consists in adding as a constituent of the mix a soap, the fatty acids of which have a congealing point below 18° C., the amount of soap thus added being between about .05% and .4% of the total weight of the mix.

6. In the process of making cake from a mix containing more sugar than flour and containing shortening fat, the step which consists in adding sodium oleate as a constituent of the mix, in an amount not substantially less than .05% and not substantially greater than .4% of the total weight of the mix.

7. In the process of making cake from a mix containing more sugar than flour and containing shortening fat and a chemical leavening agent, the step which consists in adding as a constituent of the mix soap derived from fatty acids of molecular formula containing predominantly at least 16 carbon atoms, the amount of soap thus added being between about .05% and .4% of the total weight of the mix.

8. The process of forming a cake batter which comprises mixing together flour, sugar in amount greater than the amount of flour, baking powder, shortening consisting essentially of triglyceride, milk, egg, and a quantity of soap not substantially greater than .4 per cent nor less than .05 per cent of the total weight of the mix.

9. Cake baked from a mix containing an amount of sugar greater than the amount of flour, and containing shortening fat and soap, the quantity of soap employed being sufficient to effect substantial increase in volume of the finished product as compared with cake otherwise similar but containing no soap, but being insufficient to adversely affect the flavor of the cake.

10. Cake baked from a mix containing flour, shortening consisting of triglyceride, sugar in amount greater than the amount of flour, and soap derived from fatty acids of molecular formula of 16 or more carbon atoms, the amount of soap being between about .05 per cent and about .4 per cent of the total weight of the mix.

11. Cake baked from a mix containing more sugar than flour and containing shortening fat and a relatively small proportion of sodium oleate, the quantity of sodium oleate employed being sufficient to effect substantial increase in volume of the finished product as compared with cake otherwise similar but containing no soap, but being insufficient to adversely affect the flavor of the cake.

12. Cake baked from a mix containing flour, shortening consisting essentially of triglyceride, sugar in amount greater than the amount of flour, a chemical leavening agent, and soap derived from fatty acids of molecular formula having predominantly at least 16 carbon atoms, the amount of soap being between about .05 per cent and .4 per cent of the weight of all the ingredients.

13. In the process of making cake baked from a mix containing more sugar than flour and containing shortening consisting essentially of triglyceride, the step which consists in adding as a constituent of the mix a small amount of soap, the quantity of soap employed being less than that which would adversely affect the flavor of the cake, but being sufficient to effect substantial increase in volume of the finished product as compared with cake otherwise similar but containing no soap.

14. Cakes baked from a mix containing more sugar than flour and containing shortening fat and a small quantity of added soap soluble in water, the quantity of soap employed being sufficient to effect substantial increase in volume of the finished product as compared with cake otherwise similar but containing no soap, but being insufficient to adversely affect the flavor of the cake.

15. In the process of making baked goods containing sugar and flour in the mix, the ratio of sugar to flour being sufficiently high to cause material shrinkage on cooling after baking in the absence of a shrinkage reducing agent, the step which consists in incorporating in the mix a soap in quantity sufficient to secure an increased volume of not less than about 10% over goods otherwise similar but containing no soap, the amount of soap employed being less than that which would adversely affect the flavor of the baked goods.

16. Sweet baked goods containing sugar and flour, the ratio of sugar to flour in the mix being sufficiently high to cause material shrinkage on cooling after baking in the absence of a shrinkage reducing agent, and containing soap in quantity sufficient to ensure an increased volume of not less than about 10% over goods otherwise similar but containing no soap, the amount of soap employed being less than that which would adversely affect the flavor of the baked goods.

HERBERT S. COITH.
ALBERT S. RICHARDSON.
VERLING M. VOTAW.